(12) United States Patent
Chen

(10) Patent No.: US 11,270,674 B2
(45) Date of Patent: Mar. 8, 2022

(54) DISPLAY CONTROL ADJUSTMENT METHOD AND DEVICE, AND TERMINAL, AND COMPUTER-READABLE STORAGE MEDIUM

(71) Applicant: XI'AN ZHONGXING NEW SOFTWARE CO., LTD., Shaanxi (CN)

(72) Inventor: Xingya Chen, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 0 days.

(21) Appl. No.: 16/973,455

(22) PCT Filed: Jun. 21, 2019

(86) PCT No.: PCT/CN2019/092330
§ 371 (c)(1),
(2) Date: Dec. 9, 2020

(87) PCT Pub. No.: WO2020/001384
PCT Pub. Date: Jan. 2, 2020

(65) Prior Publication Data
US 2021/0248981 A1 Aug. 12, 2021

(30) Foreign Application Priority Data
Jun. 27, 2018 (CN) .......................... 201810682571.6

(51) Int. Cl.
*G06F 3/0484* (2013.01)
*G09G 5/38* (2006.01)
(Continued)

(52) U.S. Cl.
CPC ................. *G09G 5/38* (2013.01); *G09G 5/14* (2013.01); *G09G 5/373* (2013.01); *G09G 2340/045* (2013.01); *G09G 2340/0464* (2013.01)

(58) Field of Classification Search
CPC .. G06F 3/0481; G06F 3/0202; G06F 3/04847; G09G 5/14
See application file for complete search history.

(56) References Cited

U.S. PATENT DOCUMENTS 9,959,027 B1 5/2018 Gajulapally et al.
2012/0306915 A1* 12/2012 Takemura .............. G09G 5/397
345/629

(Continued)

FOREIGN PATENT DOCUMENTS

CN 106575190 A 4/2017
CN 107967129 A 4/2017
(Continued)

OTHER PUBLICATIONS

English Translation of International Search Report dated Aug. 28, 2019; International Patent Application No. PCT/CN2019/092330, filed on Jun. 21, 2019. ISA/CN.

*Primary Examiner* — Samantha (Yuehan) Wang
(74) *Attorney, Agent, or Firm* — McDonald Hopkins LLC

(57) ABSTRACT

Provided are a display control adjustment method and device, a terminal, and a computer-readable storage medium. The method includes: selecting a display control to be adjusted from a current display interface; generating a control instruction according to a position of the display control to be adjusted with respect to the non-display region; and adjusting, according to the control instruction, the control region of the display control to be adjusted and a content display mode of the display control to be adjusted, (Continued)

so that display content in the display control to be adjusted is displayed in a display region of a display.

14 Claims, 7 Drawing Sheets

(51) Int. Cl.
*G09G 5/14* (2006.01)
*G09G 5/373* (2006.01)

(56) References Cited

U.S. PATENT DOCUMENTS

2016/0034153 A1* 2/2016 Lejeune .............. G06F 3/04842
                                        715/765
2019/0095072 A1* 3/2019 Du ....................... G06F 3/0488

FOREIGN PATENT DOCUMENTS

| | | |
|---|---|---|
| CN | 107329653 A | 11/2017 |
| CN | 107943551 A | 4/2018 |
| CN | 108182043 A | 6/2018 |

* cited by examiner

DISPLAY CONTROL ADJUSTMENT METHOD AND DEVICE, AND TERMINAL, AND COMPUTER-READABLE STORAGE MEDIUM

CROSS-REFERENCES TO RELATED APPLICATIONS

This application is a national stage application filed under 35 U.S.C. 371 based on International Patent Application No. PCT/CN2019/092330, filed on Jun. 21, 2019, which claims priority to Chinese Patent Application No. 201810682571.6 filed with the CNIPA on Jun. 27, 2018, the disclosures of which are incorporated herein by reference in their entireties.

TECHNICAL FIELD

The present disclosure relates to the field of terminals, for example, to a display control adjustment method and apparatus, a terminal, and a computer-readable storage medium.

BACKGROUND

With the popularization of intelligent terminals and the enrichment of companion applications thereof, the intelligent terminals have penetrated into all aspects of people's lives nowadays, and more and more people fulfill their own needs by operating the intelligent terminals. Therefore, how the intelligent terminals provide users with better control or display is particularly important.

At present, when a terminal performs display, display controls on a display interface are fixed, so that the display controls tend to be difficult to operate or a display mode of display content often fails to meet an actual need of a user, affecting user experience. For example, as shown in FIG. 1, a currently popular terminal with a notched display has a non-display region 12 for arranging cameras, earphones, etc. between two notched regions 11, where the display control cannot be displayed or operated in the non-display region 12. However, in actual applications, a display control whose control region might overlap the non-display region 12. For such a display control, a region of the display control for a user to operate becomes smaller since at least part of its region locates in the non-display region 12. Moreover, partial display content of the display control which locates in an overlapping region cannot be displayed, so that the display content is incomplete, thereby greatly affecting the user experience.

SUMMARY

Embodiments of the present disclosure provides a display control adjustment method and device, a terminal, and a computer-readable storage medium, solving the problem that display controls on a display interface of a terminal are fixed, so that the display controls tend to be difficult to operate or a display mode of display content fails to meet an actual need of a user, affecting user experience.

An embodiment of the present disclosure provides a display control adjustment method. The method includes steps described below.

A display control to be adjusted is selected from a current display interface, where the display control to be adjusted is a display control whose control region overlaps a non-display region of a display.

A control instruction is generated according to a position of the display control to be adjusted with respect to the non-display region.

The control region of the display control to be adjusted and a content display mode of the display control to be adjusted are adjusted according to the control instruction, so that display content in the display control to be adjusted is displayed in a display region of the display.

An embodiment of the present disclosure further provides a display control adjustment method. The method includes steps described below.

In response to detecting a control selection operation, a display control to be adjusted is selected from a current display interface according to the control selection operation.

In response to detecting a control adjustment operation, a control instruction corresponding to the detected control adjustment operation is generated according to a preset correspondence relationship between control adjustment operations and control instructions.

A control region of the display control to be adjusted or a content display mode of the display control to be adjusted is adjusted according to the control instruction.

An embodiment of the present disclosure further provides a display control adjustment device. The device includes a first control selection module, a first instruction generation module, and a first control adjustment module.

The first control selection module is configured to select a display control to be adjusted from a current display interface, where the display control to be adjusted is a display control whose control region overlaps a non-display region of a display.

The first instruction generation module is configured to generate a control instruction according to a position of the display control to be adjusted with respect to the non-display region.

The first control adjustment module is configured to adjust, according to the control instruction, a control region of the display control to be adjusted and a content display mode of the display control to be adjusted, so that display content in the display control to be adjusted is displayed in a display region of the display.

An embodiment of the present disclosure further provides a display control adjustment device. The device includes a second control selection module, a second instruction generation module, and a second control adjustment module.

The second control selection module is configured to: in response to detecting a control selection operation, select, according to the control selection operation, a display control to be adjusted from a current display interface.

The second instruction generation module is configured to: in response to detecting a control adjustment operation, generate, according to a preset correspondence relationship between control adjustment operations and control instructions, a control instruction corresponding to the detected control adjustment operation.

The second control adjustment module is configured to adjust, according to the control instruction, a control region of the display control to be adjusted or a content display mode of the display control to be adjusted.

An embodiment of the present disclosure further provides a terminal including a processor, a memory, and a communication bus.

The communication bus is configured to implement connection and communication between the processor and the memory.

The processor is configured to execute one or more first programs stored in the memory to implement steps of the first display control adjustment method described above, and/or the processor is configured to execute one or more second programs stored in the memory to implement steps of the second display control adjustment method described above.

An embodiment of the present disclosure further provides a computer-readable storage medium, storing computer-executable instructions for executing any one of the display control adjustment methods described above.

DETAILED DESCRIPTION

Embodiments of the present disclosure will be described more detailedly with reference to the drawings. However, the concept of the present disclosure can be embodied in many different forms, and should not be construed as being limited to the embodiments illustrated herein. On the contrary, these embodiments are provided to make the present disclosure thorough and complete and fully convey the concept of the present disclosure to those skilled in the art. Throughout the above description and the drawings, the same reference numbers and numerals represent the same or similar elements.

It should be understood that although the terms first, second, and the like may be used herein to describe elements or operations, these elements or operations should not be limited by these terms. These terms are only used to distinguish one element or operation from another. For example, a first operation may be referred to as a second operation, and similarly, the second operation may be referred to as the first operation, without departing from the teachings of the present disclosure.

The terms used herein are for describing particular embodiments and not intended to limit the concept of the present disclosure. As used herein, a singular form "a", "an", and "the" is intended to include a plural from, unless otherwise clearly indicated in the context. It should be further understood that the term "including" or "comprising" used in the specification specifies the existence of the described features, regions, parts, steps, operations, elements, and/or components, without excluding the existence or addition of one or more other features, regions, parts, steps, operations, elements, components, and/or combinations thereof.

Unless otherwise defined, all the terms (including technical and scientific terms) used herein have the same meanings as those commonly understood by those skilled in the art to which the present disclosure pertains. It should be further understood that terms, such as those defined in commonly used dictionaries, should be interpreted as having meanings consistent with their meanings in the context of the related art and/or the present disclosure, and will not be interpreted in an idealized or overly formal sense unless expressly so defined herein.

Embodiments of the present disclosure are further described below in detail in conjunction with the drawings and specific implementations.

Figure 2:
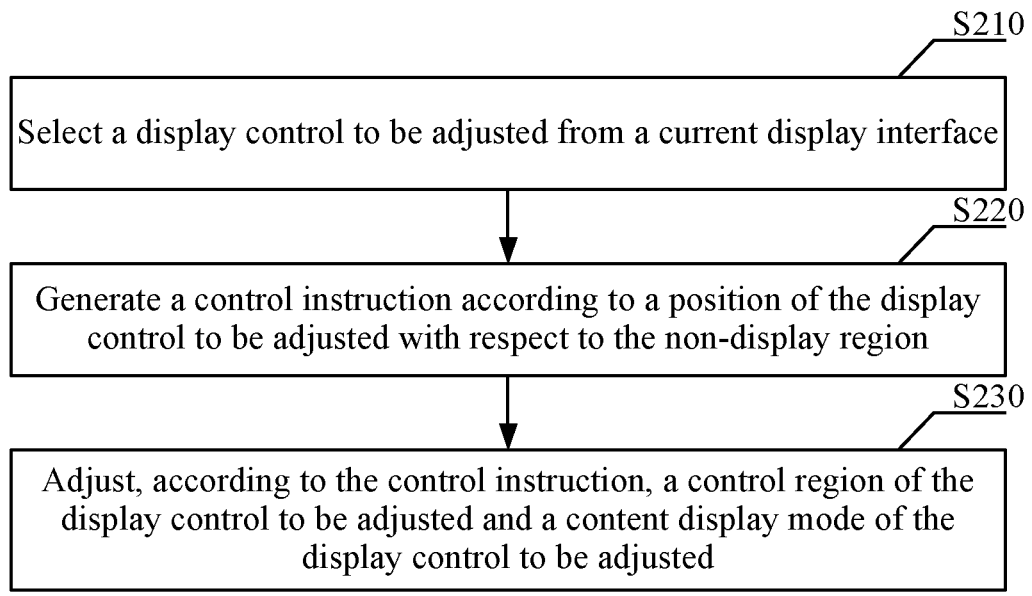
FIG. 2 is a schematic diagram of a basic process of a display control adjustment method according to an embodiment of the present disclosure.

As shown in FIG. 2 which is a schematic diagram of a basic process of a display control adjustment method according to an embodiment of the present disclosure, the method includes steps described below.

In S210, a display control to be adjusted is selected from a current display interface.

The display interface that a user sees is composed of multiple display controls and a display control group which accommodates the display controls so as to constitute the entire page. In this embodiment, when the display control to be adjusted is selected, a single display control, the entire display control group, or one or more display controls in the display control group may be selected.

In this embodiment, the display control is a control which carries and displays information such as a text, an edit box, a button, or an image.

Figure 1:
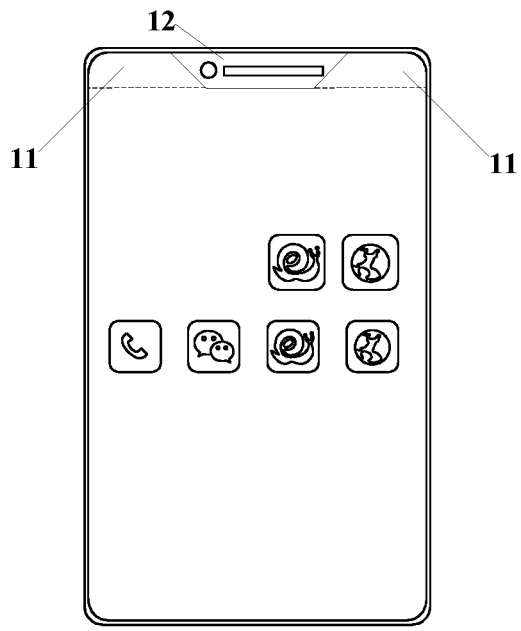
FIG. 1 is a structural diagram of a terminal with a notched display in the background of the present disclosure.
Figure 3:
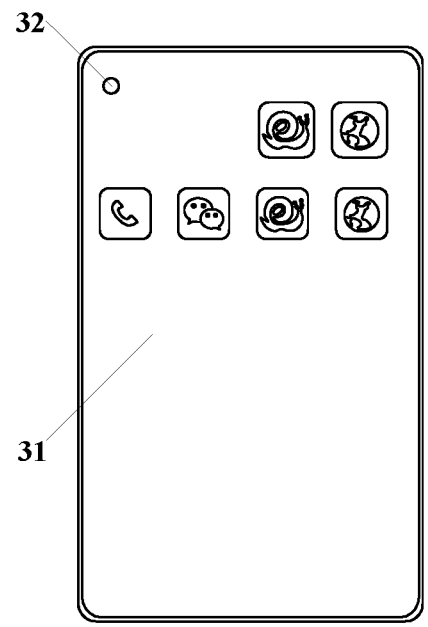
FIG. 3 is a schematic diagram of a full-screen terminal according to an embodiment of the present disclosure.

In actual applications, a full-screen terminal and a terminal with a notched display have become the current main development trend of terminal technologies with larger visible areas. However, for the full-screen terminal and the terminal with the notched display, due to certain particular needs or hardware structures, a display has a non-display region which cannot be displayed in addition to a displayable region. For example, the terminal with the notched display shown in FIG. 1 in the background has a non-display region 12 between two notched regions 11, where the non-display region 12 tends to be used for arranging a front camera, a microphone, an earphone, a distance sensor, etc., so that the non-display region 12 cannot be displayed, affecting user experience. In another embodiment, when the full-screen terminal shown in FIG. 3 performs display, a front camera 32 will form a non-display region on a display 31, resulting in "missing" display information and affecting the user experience.

Figure 4:
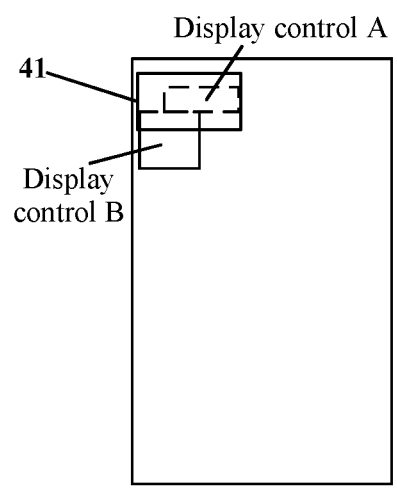
FIG. 4 is a schematic diagram illustrating that display controls overlap a special-shaped region according to an embodiment of the present disclosure.

Based on this, if a certain display control completely falls in a special-shaped region, for example, as shown in FIG. 4, a display control A completely falls in the special-shaped region 41, the display control has the problem of a failure to trigger a function of the display control through a touch operation on the display; moreover, the display control also has the problem of a failure to display the display content to the user, resulting in extremely poor user experience. If a region of a certain display control partially overlaps the special-shaped region, for example, a display control B partially overlaps the special-shaped region 41 in FIG. 4, the display control B will be difficult to operate when the function of the display control is triggered through the touch operation on the display (only a region falling out of the special-shaped region can be touch-operated); moreover, the display control will also have the problem that display content in a region falling in the special-shaped region cannot be displayed to the user so that the user receives incomplete information, which will also result in extremely poor user experience.

In the display control adjustment method shown in FIG. 2, the display control to be adjusted is a display control whose control region overlaps the non-display region of the display. For example, the display control A and the display control B in FIG. 4 are the display controls to be adjusted.

In S220, a control instruction is generated according to a position of the display control to be adjusted with respect to the non-display region.

In the display control adjustment method shown in FIG. 2, the generated control instruction includes a control instruction for enlargement in an opposite direction with respect to the non-display region. For example, the position of the display control to be adjusted with respect to the non-display region is on a left side of the non-display region, that is, an overlapping region between the display control to be adjusted and the non-display region is on a right side of the display control to be adjusted, so that a control instruction to enlarge the display control to be adjusted to the left is generated.

In S230, according to the control instruction, a control region of the display control to be adjusted is adjusted, and a content display mode of the display control to be adjusted is adjusted.

In the display control adjustment method shown in FIG. 2, the adjustment should enable the display content in the display control to be adjusted to be displayed in a display region of the display.

In the display control adjustment method shown in FIG. 2, the display control to be adjusted, which is selected from all display controls on the current display interface, may be automatically determined by the terminal or manually determined by the user.

In an embodiment, when the terminal automatically determines the display control to be adjusted, the terminal identifies, according to a control region and a control position of each display control on the current display interface and a preset screen parameter, the display control whose control region overlaps the non-display region as the display control to be adjusted. In an embodiment, the terminal first determines the non-display region on the terminal according to the preset screen parameter and then select, according to the determined non-display region, and the control region and the control position of each display control on the current display interface, the display control with an overlap with the non-display region from all the display controls on the current display interface as the display control to be adjusted.

In this embodiment, the screen parameter is used for determining the non-display region of the display. In an embodiment, the screen parameter includes a parameter of the non-display region and/or a parameter of the display region. In this embodiment, location information is determined through coordinates. That is, in this embodiment, the terminal may establish a two-dimensional coordinate system on the display, so as to delineate a region of any one display control and the non-display region on the display by means of x and y coordinates. Therefore, in this embodiment, the parameter of the non-display region may be a set of x and y coordinates corresponding to the non-display region, and correspondingly the parameter of the display region is a set of x and y coordinates for the displayable region on the display. The set of x and y coordinates in this embodiment may be embodied in the form of calculation formulas. In an embodiment, since the display control is generally a regular rectangle, the display control may be simply determined through the coordinates of points at four corners. It should be understood that, in this embodiment, the display controls have an overlap with the non-display region can be easily calculated through the set of x and y coordinates corresponding to each display control.

In this embodiment, if the screen parameter includes the parameter of the non-display region, the terminal may directly call the parameter of the non-display region to determine the non-display region. In fact, a terminal manufacturer may store the coordinates of the non-display region in the terminal before the terminal leaves the factory. Correspondingly, if the screen parameter includes the parameter of the display region, the terminal determines an ideal regular region of a screen and an actual displayable region according to the parameter of the display region and removes the actual displayable region from the ideal regular region of the screen to obtain the non-display region. In an embodiment, a manner for determining the ideal regular region of the screen according to the parameter of the display region is to obtain a regular rectangular region according to four most boundary coordinates in a coordinate set of the display region, where the regular rectangular region is the ideal regular region of the screen.

In an embodiment, when the user manually determines the display control to be adjusted, the user may perform a first control selection operation on the terminal, and the terminal may select a display control to be operated according to a received first control selection operation, detect whether a control region of the display control to be operated overlaps the non-display region of the display, and if the control region of the display control to be operated overlaps the non-display region of the display, take the display control to be operated as the display control to be adjusted.

In this embodiment, the first control selection operation is a touch operation of the user on the display, such as a tap or long press operation on a certain display control.

In this embodiment, the control instruction includes one or more of a region enlargement instruction, a region reduction instruction, a display content enlargement instruction, a display content reduction instruction, or a display content highlight instruction. Different control instructions correspond to different adjustment operations. For example, for the region enlargement instruction, the terminal will enlarge the region of the display control to be adjusted according to the region enlargement instruction; for the region reduction instruction, the terminal will reduce the region of the display control to be adjusted according to the region reduction instruction; for the display content enlargement instruction, the terminal will enlarge and display the display content in the display control to be adjusted according to the display content enlargement instruction; for the display content reduction instruction, the terminal will reduce and display the display content in the display control to be adjusted according to the display content reduction instruction; and for the display content highlight instruction, the terminal will highlight and display the display content in the display control to be adjusted according to the display content highlight instruction.

In the display control adjustment method shown in FIG. 2, after the display control which overlaps the non-display region is selected as the display control to be adjusted, the terminal automatically generates the corresponding control instruction. In this embodiment, the control instruction generated at this time may be set as the region enlargement instruction and a display content displacement instruction. That is, at this time, the terminal will adjust the region of the display control to be adjusted and the content display mode of the display control to be adjusted.

In an embodiment, when the terminal enlarges the display control according to the region enlargement instruction, the display control to be adjusted is enlarged in both a length direction and a width direction, for example, the display control to be adjusted is enlarged by N times in the length direction and enlarged by M times in the width direction (N and M are natural numbers greater than 1). In a specific implementation of this embodiment, the display control to be adjusted may be enlarged by a same factor in the length direction and the width direction, that is, N=M. In addition, when the terminal enlarges the display control according to the region enlargement instruction, the display control to be adjusted may be enlarged in only the length direction or the width direction.

Meanwhile, to ensure that the display content in the enlarged display control can be displayed completely, the terminal will adjust, according to the display content displacement instruction, the display content in the display control to be adjusted to a region, which does not overlap the non-display region, of the display control to display.

In an embodiment, the terminal detects whether display content exists in a region of the display control to be adjusted which overlaps the non-display region; in response to the existence of the display content, the terminal determines the display content in this region and moves the display content sequentially to the region, which does not overlap the non-display region, of the display control to be adjusted to display until the display content does not exist in the region, which overlaps the non-display region, of the display control to be adjusted. In response to the non-existence of the display content, the terminal may not adjust the display content.

In this embodiment, the display content is a text, a picture, a video, etc. For different display content, a specific adjustment process may be different. For example, for the text, after determining the display content in the region of the display control to be adjusted which overlaps the non-display region, the terminal may increase an interval between a first word in the display content and a word previous to the first word, so that the display content in the overlapping region is displayed in a non-overlapping region, so as to achieve an adjustment effect shown in FIG. 5.

Figure 5:
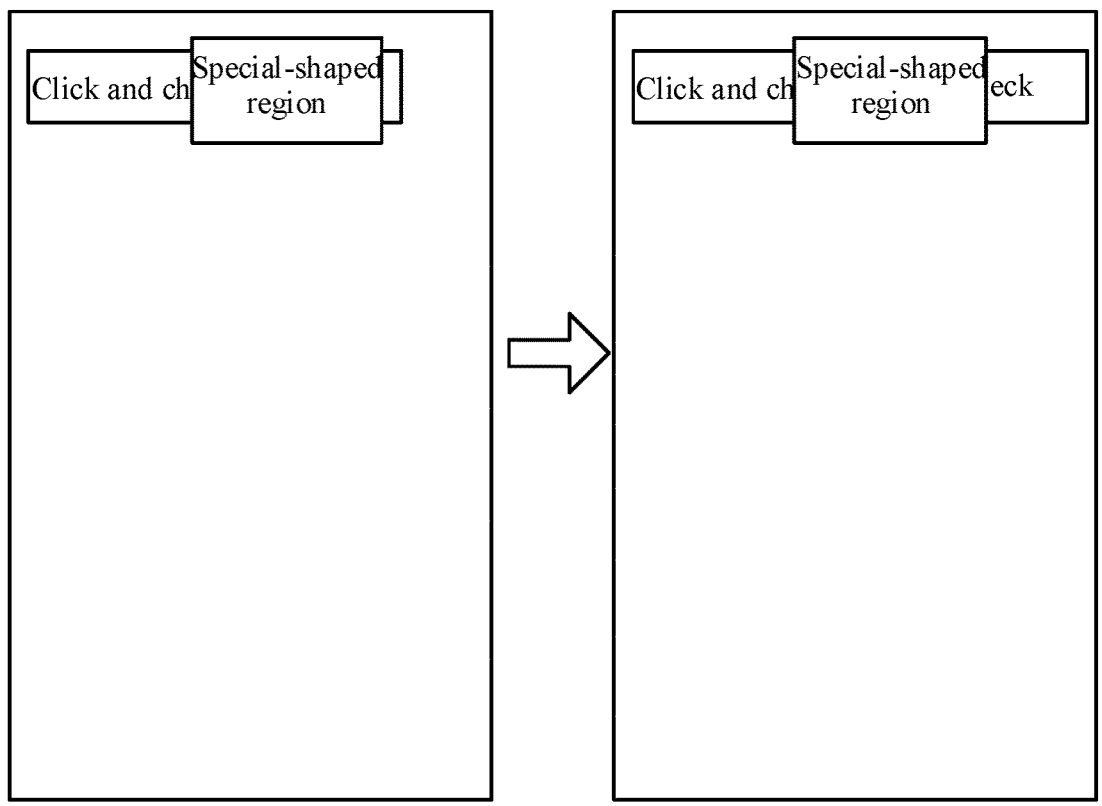
FIG. 5 is a schematic diagram of text adjustment and display according to an embodiment of the present disclosure.

Alternatively, the terminal acquires an order of multiple texts and then redistribute display positions in the non-overlapping region to the multiple texts according to the order, which can also achieve the adjustment effect shown in FIG. 5. For example, for the picture, after the display content in the region of the display control to be adjusted which overlaps the non-display region is determined, which direction of the display control the overlap is located in is detected, and then the picture is translated in an opposite direction. For example, if the overlap is located on an upper side of the display control, the picture is moved down until no picture is detected in the region of the display control to be adjusted which overlaps the non-display region.

In a specific implementation of this embodiment, an enlarged area of the display control should be greater than or equal to an area of the non-display region, so as to ensure that the enlarged display control has a region which does not overlap the non-display region, and a size of the region which does not overlap the non-display region is greater than or equal to an original size of the display control, thereby ensuring that the display control has a sufficient displayable region to accommodate the display content after positional adjustment.

In this embodiment, the terminal may automatically trigger the detection of whether the display control overlaps the non-display region. For example, it is set that when the terminal enters a display interface, the terminal automatically detects whether a display control in the interface overlaps the non-display region, and if so, automatically adjusts such a display control as the display control to be adjusted.

In this embodiment, the terminal may not automatically trigger the detection of whether the display control overlaps the non-display region, but the user triggers the detection. For example, whether to trigger the detection of whether the display control overlaps the non-display region may be determined by detecting whether an object outside the terminal approaches the non-display region. In an embodiment, it is detected whether an object outside the terminal approaches the non-display region. If so, it is further determined whether a distance between the object and the non-display region is less than or equal to a preset distance threshold. If so, the detection of whether the display control overlaps the non-display region can be triggered. In this embodiment, the non-display region may be equipped with a progressive sensor (such as an infrared sensor) to monitor the approach of an object.

Figure 6:
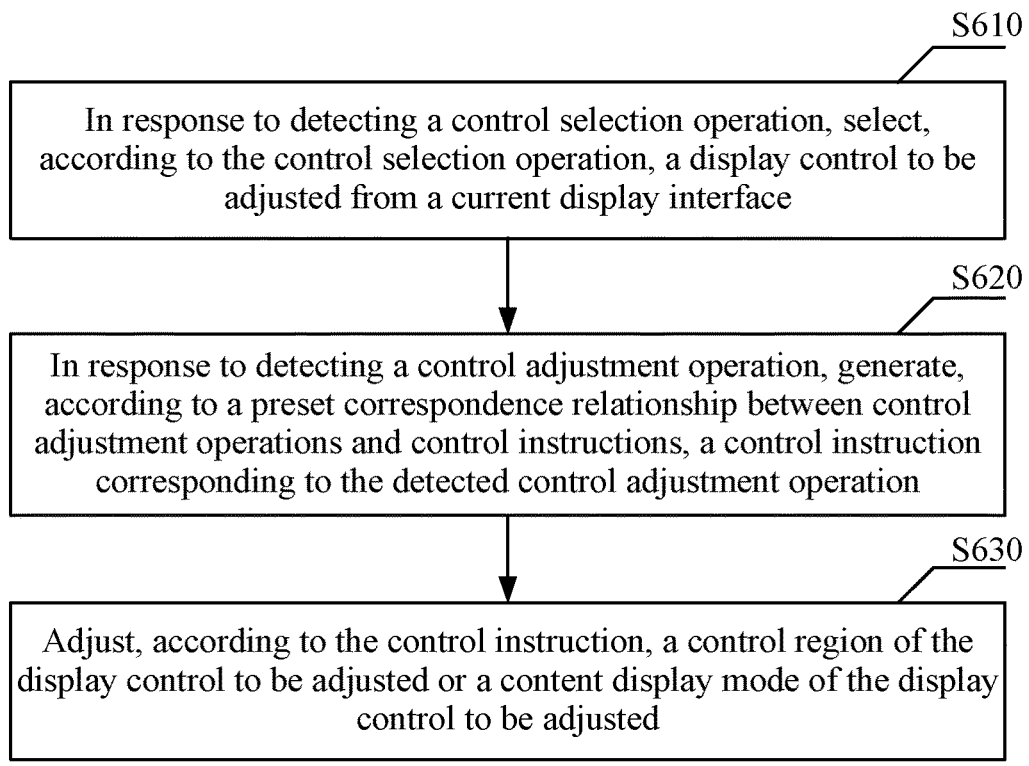
FIG. 6 is a schematic diagram of a basic process of another display control adjustment method according to an embodiment of the present disclosure.

As shown in FIG. 6 which is a schematic diagram of a basic process of another display control adjustment method according to an embodiment of the present disclosure, the method includes steps described below.

In S610, in response to detecting a control selection operation, a display control to be adjusted is selected from a current display interface according to the control selection operation.

In an embodiment, the control selection operation shown in FIG. 6 is understood as a second control selection operation. In the display control adjustment method shown in FIG. 6, the display control to be adjusted is not completely consistent with the display control to be adjusted in the display control adjustment method shown in FIG. 2. In the display control adjustment method shown in FIG. 6, the display control to be adjusted may be any display control, as long as it is selected by the user through the second control selection operation. In the display control adjustment method shown in FIG. 2, the display control to be adjusted has to be a display control whose control region overlaps a non-display region of a display.

Figure 7:
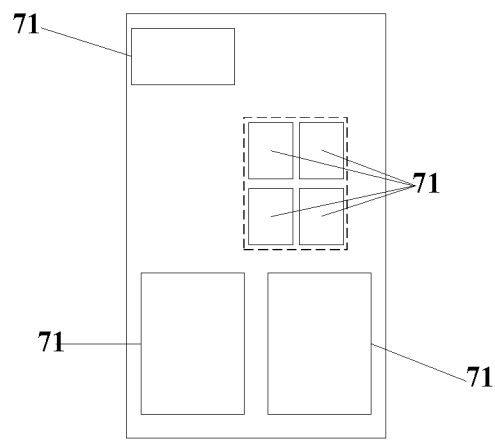
FIG. 7 is a schematic diagram of display controls according to an embodiment of the present disclosure.

In this embodiment, the second control selection operation may be a touch operation of a user on the display for any display control. For example, for multiple display controls 71 in FIG. 7, the user selects any display control as the display control to be adjusted by tapping the display control.

When the display control is selected, the user may simultaneously select multiple display controls as the display controls to be adjusted. In addition, the user may also deselect a selected display control to be adjusted through a corresponding operation to make it a normal display control. For example, for the multiple display controls 71 in FIG. 7, the user selects a display control A as the display control to be adjusted by tapping the display control A; if the user finds a selection mistake, the user may tap the display control A again to deselect the display control A. It should be understood that the above tap operation is only a feasible operation manner illustrated in this embodiment and does not mean that the selection operation and the deselection operation in this embodiment may only be the tap operation. In addition, the above selection operation and deselection operation may be different.

In many cases, the display control is essentially invisible, and the user can only see the content on the display control. Therefore, a control adjustment mode may be set, and it is required that the terminal can select the display control to be adjusted from all display controls on the current display interface only when the terminal enters the control adjustment mode.

In this embodiment, the control adjustment mode may be entered through a dedicated interface. For example, a virtual button similar to a flight mode switch button may be set to control the control adjustment mode to be on/off. For example, a corresponding mode switch button may be set in a drop-down menu bar or "settings" of the terminal. Of course, physical buttons may also be set to control the control adjustment mode to be on/off. For example, it is set that the control adjustment mode is turned on by simultaneously pressing a power button and a home button.

In S620, in response to detecting a control adjustment operation, a control instruction corresponding to the detected control adjustment operation is generated according to a preset correspondence relationship between control adjustment operations and control instructions.

In this embodiment, it may be set that the display control to be adjusted can be adjusted through a corresponding control adjustment operation such as a gesture or a button press. That is, the terminal may generate a control instruction corresponding to a human-machine interaction operation through the corresponding human-machine interaction operation and a preset correspondence relationship between human-machine interaction operations and control instructions in the terminal to adjust the display control to be adjusted. For example, it is set that a stretch operation corresponds to a region enlargement instruction and a pinch operation corresponds to a region reduction instruction, and so on. In this embodiment, a specific correspondence relationship between control instructions and human-machine interaction operations may be preset by an operator based on experience and actual needs.

In this embodiment, in addition to the generation of a corresponding control instruction through the human-machine interaction operation, the terminal may also automatically generate the control instruction. For example, the terminal automatically generates the control instruction according to a size of the display control to be adjusted. For example, if the size of the display control to be adjusted is smaller than a preset size, the region enlargement instruction is automatically generated; if a text size display effect of display content (assumed to be text content) in the display control to be adjusted is smaller than a preset text size display effect, a display content enlargement instruction is automatically generated, and so on. In another embodiment, the terminal automatically generates the control instruction according to a position of the display control to be adjusted. For example, if the display control is at an edge of the terminal, the region enlargement instruction is automatically generated to stretch a region of the display control.

In S630, according to the control instruction, a control region of the display control to be adjusted is adjusted, or a content display mode of the display control to be adjusted is adjusted.

Figure 8:
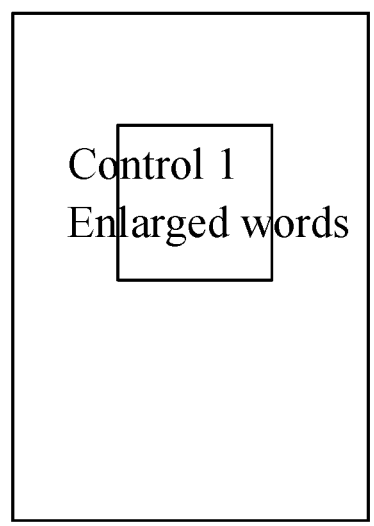
FIG. 8 is a schematic diagram illustrating that display content is displayed outside a display control according to an embodiment of the present disclosure.

In the display control adjustment method shown in FIG. 6, when the display control to be adjusted is adjusted according to the control instruction, the region of the display control to be adjusted may be scaled in both a length direction and a width direction, or the region of the display control to be adjusted may be scaled in either the length direction or the width direction. Meanwhile, the display content in the display control to be adjusted may be scaled in size and highlighted. For example, the display content is enlarged and highlighted to make it convenient for the user to check. In an embodiment, when the size of the display content in the display control to be adjusted is enlarged, if the enlarged display content requires a display region greater than the region of the display control, a display layer of the display content may be displayed on top of all display controls, that is, the display content may be displayed outside the display control, as shown in FIG. 8.

It should be understood that in this embodiment, the user may directly perform a touch adjustment operation on a control on the display, and the terminal automatically adjusts a display control closest to an initial touch position of the touch adjustment operation as the display control to be adjusted according to the touch adjustment operation.

In this embodiment, the display content in the display control may be adjusted while the region of the display control is adjusted. For example, while the display control is enlarged, the display content in the display control may be enlarged. In an embodiment, the display control and the display content may be scaled at a same ratio, to ensure that the display control and the display content always match in size and to ensure a better display effect. However, it should be understood that the display control and the display content may also be scaled at different ratios.

In the two display control adjustment methods provided by this embodiment, when the region of the display control to be adjusted is adjusted, for the display controls other than the display control to be adjusted in the display interface, there are at least two control manners. That is, for the entire display interface, there may be at least two final adjustment manners below.

A first adjustment manner is displaying the display layer of the display control to be adjusted in a top layer of the current display interface, and maintaining positions of the display controls on the current display interface other than the display control to be adjusted unchanged.

In this case, if enlargement or other adjustment is performed on the display control to be adjusted, the display control to be adjusted may cover surrounding display controls, and accordingly the display control to be adjusted will be noticeable, making it more convenient for the user to operate the display control or check the display content thereon.

A second adjustment manner is adjusting a position and/or a size of a display control around the display control to be adjusted with the display control to be adjusted as reference in a process of adjusting the region of the display control to be adjusted.

In this case, all the display controls on the interface can be displayed completely and will not be covered, avoiding the problem that the user fails to operate some display controls or see content in some display controls and ensuring the integrity of display controls operable by the user and the integrity of the content that can be seen by the user.

According to the first display control adjustment method provided by the embodiment of the present disclosure, the display control to be adjusted is selected from the current display interface, where the display control to be adjusted is the display control whose control region overlaps the non-display region of the display; the control instruction is generated according to the position of the display control to be adjusted with respect to the non-display region; and according to the control instruction, the control region of the display control to be adjusted is adjusted and the content display mode of the display control to be adjusted is adjusted, so that the display content in the display control to be adjusted is displayed in the display region of the display. In this way, the mode in the related art in which display controls in a display interface are fixed is broken through, and the display control to be adjusted with an overlap with the non-display region of the display can be dynamically adjusted, so that the display control can be better operated and the display content can be completely displayed. Therefore, the display controls to be adjusted better meet the actual needs of users and improve the user experience.

In addition, in response to a relatively small page, for example, when a computer page is displayed on a mobile phone, display controls in the interface are too small and tend to be difficult for a user to operate, and moreover, the display content in the display controls tends to be displayed with a relatively small font size, so that the user looks hard, which does not meet the needs of the user and results in poor user experience. According to another display control adjustment method provided by this embodiment, in response to detecting the control selection operation, the display control to be adjusted is selected from the current display interface according to the control selection operation (here the display control to be adjusted is different from that in the first display control adjustment method and is selected through the second control selection operation); in response to detecting the control adjustment operation, the control instruction corresponding to the control adjustment operation is generated according to the preset correspondence relationship between control adjustment operations and control instructions; and finally, according to the control instruction, the control region of the display control to be adjusted is adjusted, or the content display mode of the display control to be adjusted is adjusted. With this solution, the mode in the related art in which display controls in a display interface are fixed is broken through, and the user can select the corresponding display control through the corresponding selection operation to adjust the region or the content display mode, so that the corresponding display control can be better operated by the user and the content in the display control can be better displayed. Therefore, the display control to be adjusted better meets the actual needs of users and improves the user experience.

That is, in this embodiment, the terminal can automatically determine the display control that overlaps the non-display region and automatically adjust the display control, ensuring that the non-display region will not cause affect the display control or the display content in the display control to be missing during display. Moreover, in this embodiment, users can manually adjust the display control to be adjusted in the display interface and a display mode of the display content in the display control according to their own needs, which better meets the actual needs of users and improves the user experience.

In summary, the embodiment of the present disclosure breaks through the mode in the related art in which display controls in a display interface are fixed, and enables the display controls to be better operated and the display content to be completely displayed, so that these display controls to be adjusted better meet the actual needs of users and improve the user experience.

On the basis of the above embodiment, this embodiment further illustrates the solution of the present disclosure through a more specific display control adjustment process.

Figure 9:
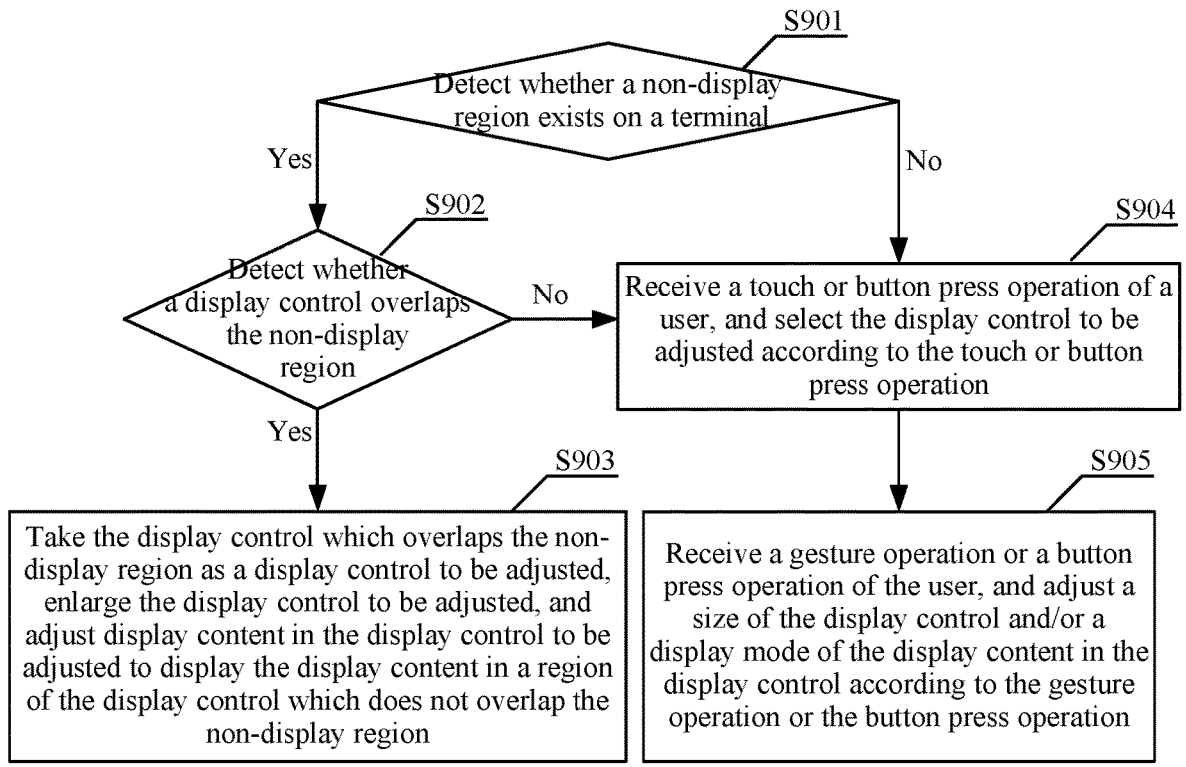
FIG. 9 is a schematic diagram of a display control adjustment process according to an embodiment of the present disclosure.

As shown in FIG. 9 which is a schematic diagram of a display control adjustment process according to this embodiment, the process includes steps described below.

In S901, it is detected whether a non-display region exists on a terminal. If the non-display region exists, S902 is performed; otherwise, S904 is performed.

In this embodiment, the terminal may actively detect a display to obtain a displayable region and the non-display region which cannot be displayed. The terminal may also pre-store coordinate parameters of the non-display region when it leaves the factory, so that the terminal can directly confirm a special-shaped position.

In S902, it is detected whether a display control overlaps the non-display region. In response to the existence of the display control that overlaps the non-display region, S903 is performed; otherwise, S904 is performed.

In fact, the terminal tends to have a screen rotation function. For example, a portrait holding position is converted to a landscape holding position. Therefore, in this embodiment, in response to the existence of the non-display region, an intelligent terminal system will record current coordinates (x, y) covered by the non-display region in real time; once a screen is rotated, the terminal will recalculate the coordinates of the non-display region, so as to recalculate a region where a display control cannot be displayed.

In this embodiment, each display control has its x and y coordinates in the entire interface. Since the non-display region may be an irregular graphic, content, which is covered by the non-display region, in the display control may be calculated by calculating whether a point of the display control is in the non-display region and identifying whether adjacent points are also in the non-display region. In an embodiment, if the non-display region is a regular graphic, whether the display control overlaps the non-display region may be determined through coordinates of points at four corners of the display control and coordinates of four corners of the non-display region.

In S903, the display control which overlaps the non-display region is taken as a display control to be adjusted, the display control to be adjusted is enlarged, and display content in the display control to be adjusted is adjusted to be displayed in a region of the display control which does not overlap the non-display region.

In this embodiment, a width and a length of the display control may be enlarged by a same factor to be w*k and h*k (w is an original width, h is an original length, and k is an enlargement factor greater than 1), and $w*h(k^2-1)$ is an increased area after the adjustment with respect to the original display control. In this embodiment, $w*h(k^2-1)$ should be greater than an area of the non-display region.

In this embodiment, when the display content is adjusted, if the display content is a text, the terminal calculates covered text content in the control and directly adjusts and increases an interval between a first covered word and an uncovered word previous to the first covered word, so that covered words are moved and displayed outside the non-display region, thereby enabling the text to be completely displayed; if the display content is a picture, which side of the display control a covered region is located on is checked, and then the picture is directly translated to an opposite side (for example, if the covered region is located on an upper side of the display control, the picture is directly translated downwards). In an embodiment, for the adjustment such as image translation, the display control may be enlarged in only one direction (for example, if the covered region is located on the upper side of the display control, the picture needs to be translated downwards, and the display control only needs to be enlarged in a downward direction).

In this embodiment, when the display control is adjusted, a display priority of the display control may be increased to make the display control located in an uppermost layer, so as not to affect the sizes and layout of other display controls.

In this embodiment, when the display control is adjusted, the display priority of the display control may not be increased. Instead, in a process of adjusting the display control to be adjusted, a size of a display control around the display control to be adjusted in the current page is re-adjusted to adapt to the adjustment of the display control to be adjusted and form a new display interface.

In this embodiment, the non-display region may be equipped with a progressive sensor which can monitor the approach of an object. Therefore, S902 and S903 are triggered only when the approach of the object is monitored.

In S904, a touch or button press operation of a user is received, and the display control to be adjusted is selected according to the touch or button press operation.

The display interface that the user sees is composed of multiple display controls and a display control group which may accommodate the display controls so as to constitute the entire page. In this embodiment, when the display control to be adjusted is selected, a single display control may be selected, the entire display control group may be selected, or one or more display controls in the display control group may be selected.

In S905, a gesture operation or a button press operation of the user is received, and a size of the display control and/or a display mode of the display content in the display control are adjusted according to the gesture operation or the button press operation.

Each display control can be adjusted by a corresponding gesture operation or button press operation. In this embodiment, the user may freely scale the display control, and adjust the size and display brightness of the display content in the display control.

Figure 10:
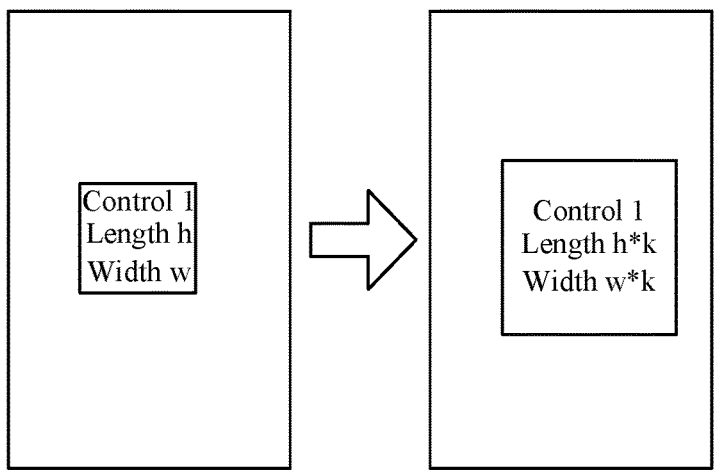
FIG. 10 is a schematic diagram illustrating that a display control is enlarged according to an embodiment of the present disclosure.
Figure 11:
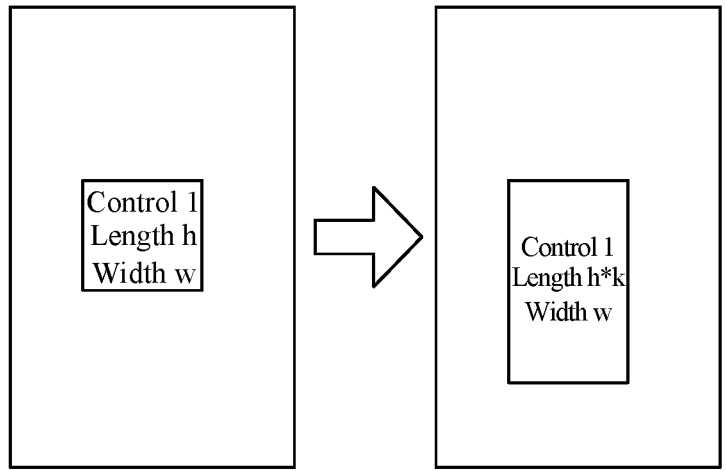
FIG. 11 is another schematic diagram illustrating that a display control is enlarged according to an embodiment of the present disclosure.
Figure 12:
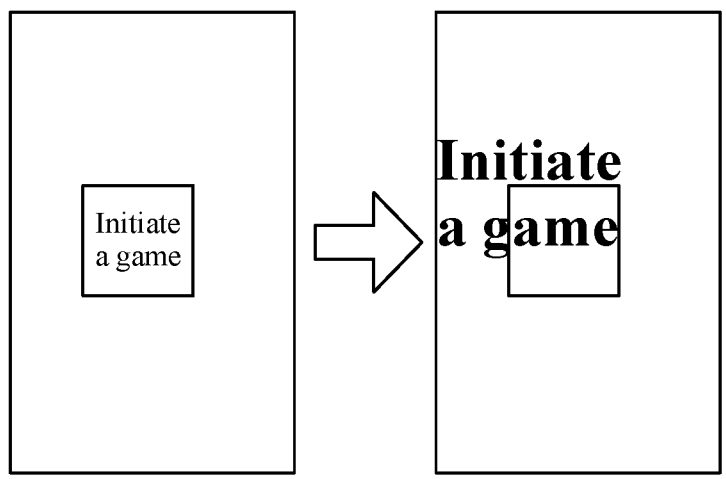
FIG. 12 is a schematic diagram illustrating that display content is enlarged according to an embodiment of the present disclosure.

For example, when the display control is enlarged, the width and the length of the display control may be enlarged by the same factor to be $w1*k$ and $h1*k$ (w1 is an original width, h1 is an original length, and k is an enlargement factor greater than 1), as shown in FIG. 10. Only the width or the length of the display control may be enlarged, as shown in FIG. 11, for example. When the display content in the display control is enlarged, the display content may be enlarged and highlighted. Moreover, if the enlarged display content cannot be completely displayed in the region of the display control, a text layer may be displayed on top of all display controls, as shown in FIG. 12.

In this embodiment, when the user adjusts the display control, the terminal may increase the display priority of the display control to make the display control located in the uppermost layer, so as not to affect the sizes and layout of other display controls.

In this embodiment, when the user adjusts the display control, the terminal may not increase the display priority of the display control. Instead, in the process of adjusting the display control to be adjusted, the size of the display control around the display control to be adjusted in the current page is re-adjusted to adapt to the adjustment of the display control to be adjusted and form the new display interface.

This display control adjustment process can adjust any control layout to meet a particular display need of the user. Moreover, in response to the existence of the non-display region, whether a display control overlaps the non-display region currently may be calculated in real time, and the sizes and content of these display controls are automatically adjusted to completely display the content.

Figure 13:
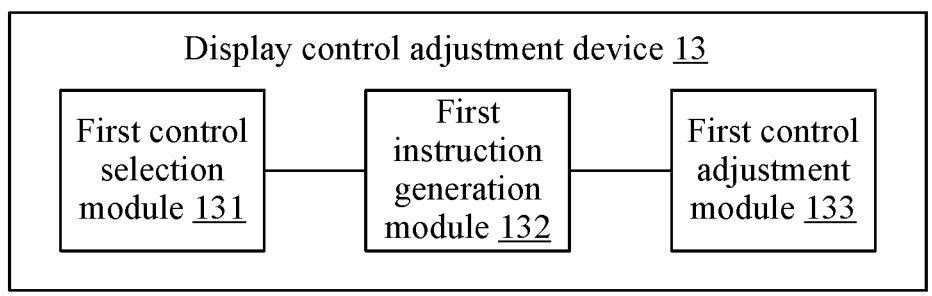
FIG. 13 is a structural diagram of a display control adjustment device according to an embodiment of the present disclosure.

Referring to FIG. 13, a display control adjustment device 13 according to an embodiment of the present disclosure includes a first control selection module 131, a first instruction generation module 132, and a first control adjustment module 133.

The first control selection module 131 is configured to select a display control to be adjusted from a current display interface, where the display control to be adjusted is a display control whose control region overlaps a non-display region of a display.

The first instruction generation module 132 is configured to generate a control instruction according to a position of the display control to be adjusted with respect to the non-display region.

The first control adjustment module 133 is configured to adjust, according to the control instruction, a control region of the display control to be adjusted and a content display mode of the display control to be adjusted, so that display content in the display control to be adjusted is displayed in a display region of the display.

The display interface that a user sees is composed of multiple display controls and a display control group which accommodates the display controls so as to constitute the entire page. In this embodiment, when the display control to be adjusted is selected, a single display control may be selected, the entire display control group may be selected, or one or more display controls in the display control group may be selected.

In this embodiment, the display control is a control which carries and displays information such as a text, an edit box, a button, or an image.

In actual applications, a full-screen terminal and a terminal with a notched display have become the current main development trend of terminal technologies with larger visible areas. However, for the full-screen terminal and the terminal with the notched display, due to certain particular needs or hardware structures, the display has the non-display region which cannot be displayed in addition to a displayable region. For example, the terminal with the notched display shown in FIG. 1 in the background has a non-display region 12 between two notched regions 11, where the non-display region 12 tends to be used for arranging a front camera, a microphone, an earphone, a distance sensor, etc., so that the non-display region 12 cannot be displayed, affecting user experience. In another embodiment, when the full-screen terminal shown in FIG. 3 performs display, a front camera 32 will form a non-display region on a display 31, resulting in "missing" display information and affecting the user experience.

Based on this, if a certain display control completely falls in a special-shaped region, for example, as shown in FIG. 4, a display control A completely falls in the special-shaped region 41, the display control has the problem of a failure to trigger a function of the display control through a touch operation on the display; moreover, the display control also has the problem of a failure to display the display content to the user, resulting in extremely poor user experience. If a region of a certain display control partially overlaps the special-shaped region, for example, a display control B partially overlaps the special-shaped region 41 in FIG. 4, the display control B will be difficult to operate when the function of the display control is triggered through the touch operation on the display (only a region falling out of the special-shaped region can be touch-operated); moreover, the display control will also have the problem that display content in a region falling in the special-shaped region cannot be displayed to the user so that the user receives incomplete information, which will also result in extremely poor user experience.

In this embodiment, the display control to be adjusted is the display control whose control region overlaps the non-display region of the display. For example, the display control A and the display control B in FIG. 4 are the display controls to be adjusted.

In this embodiment, the generated control instruction includes a control instruction for enlargement in an opposite direction with respect to the non-display region. For example, the position of the display control to be adjusted with respect to the non-display region is on a left side of the non-display region, that is, an overlapping region between the display control to be adjusted and the non-display region is on a right side of the display control to be adjusted, so that a control instruction to enlarge the display control to be adjusted to the left is generated.

In this embodiment, the display control to be adjusted, which is selected by the first control selection module 131 from all display controls on the current display interface, may be automatically determined by the terminal or manually determined by the user.

When the terminal automatically determines the display control to be adjusted, the first control selection module 131 is configured to identify, according to a control region and a control position of each display control on the current display interface and a preset screen parameter, the display control whose control region overlaps the non-display region as the display control to be adjusted.

In an embodiment, the first control selection module 131 first determines the non-display region on the terminal according to the preset screen parameter and then select, according to the determined non-display region and the control region and the control position of each display control on the current display interface, the display control with an overlap with the non-display region from all the display controls on the current display interface as the display control to be adjusted.

In this embodiment, the screen parameter is used for determining the non-display region of the display. In an embodiment, the screen parameter includes a parameter of the non-display region and/or a parameter of the display region. In this embodiment, location information may be determined through coordinates. That is, in this embodiment, the terminal may establish a two-dimensional coordinate system on the display, so as to delineate a region of any one display control and the non-display region on the display by means of x and y coordinates. Therefore, in this embodiment, the parameter of the non-display region may be a set of x and y coordinates corresponding to the non-display region, and correspondingly the parameter of the display region is a set of x and y coordinates for the displayable region on the display. The set of x and y coordinates in this embodiment may be embodied in the form of calculation formulas. In an embodiment, since the display control is generally a regular rectangle, the display control may be simply determined through the coordinates of points at four corners. It should be understood that, in this embodiment, the display controls have an overlap with the non-display region may be easily calculated through the set of x and y coordinates corresponding to each display control.

In this embodiment, if the screen parameter includes the parameter of the non-display region, the first control selection module 131 may directly call the parameter of the non-display region to determine the non-display region. In fact, a terminal manufacturer may store the coordinates of the non-display region in the terminal before the terminal leaves the factory. Correspondingly, if the screen parameter includes the parameter of the display region, the terminal determines an ideal regular region of a screen and an actual displayable region according to the parameter of the display region and removes the actual displayable region from the ideal regular region of the screen to obtain the non-display region. In an embodiment, a manner for determining the ideal regular region of the screen according to the parameter of the display region is to obtain a regular rectangular region according to four most boundary coordinates in a coordinate set of the display region, where the regular rectangular region is the ideal regular region of the screen.

When the user manually determines the display control to be adjusted, the user may perform a first control selection operation on the terminal, and the first control selection module 131 may select a display control to be operated according to a received first control selection operation, detect whether a control region of the display control to be operated overlaps the non-display region of the display, and if the control region of the display control to be operated overlaps the non-display region of the display, take the display control to be operated as the display control to be adjusted.

In this embodiment, the first control selection operation may be a touch operation of the user on the display, such as a tap or long press operation on a certain display control.

In this embodiment, the control instruction may include one or more of a region enlargement instruction, a region reduction instruction, a display content enlargement instruction, a display content reduction instruction, or a display content highlight instruction. Different control instructions correspond to different adjustment operations. For example, for the region enlargement instruction, the terminal will enlarge the region of the display control to be adjusted according to the region enlargement instruction; for the region reduction instruction, the terminal will reduce the region of the display control to be adjusted according to the region reduction instruction; for the display content enlargement instruction, the terminal will enlarge and display the display content in the display control to be adjusted according to the display content enlargement instruction; for the display content reduction instruction, the terminal will reduce and display the display content in the display control to be adjusted according to the display content reduction instruction; and for the display content highlight instruction, the terminal will highlight and display the display content in the display control to be adjusted according to the display content highlight instruction.

In this embodiment, after the first control selection module 131 selects the display control which overlaps the non-display region as the display control to be adjusted, the first instruction generation module 132 automatically generates the corresponding control instruction. In this embodiment, the control instruction generated at this time may be set as the region enlargement instruction and a display content displacement instruction. That is, at this time, the first control adjustment module 133 will adjust the region of the display control to be adjusted and the content display mode of the display control to be adjusted.

In an embodiment, when the first control adjustment module 133 enlarges the display control according to the region enlargement instruction, the display control to be adjusted may be enlarged in both a length direction and a width direction, for example, the display control to be adjusted is enlarged by N times in the length direction and enlarged by M times in the width direction (N and M are natural numbers greater than 1). In a specific implementation of this embodiment, the display control to be adjusted may be enlarged by a same factor in the length direction and the width direction, that is, N=M. In addition, when the terminal enlarges the display control according to the region enlargement instruction, the display control to be adjusted may be enlarged in only the length direction or the width direction.

Meanwhile, to ensure that the display content in the enlarged display control can be displayed completely, the first control adjustment module 133 will adjust, according to the display content displacement instruction, the display content in the display control to be adjusted to a region, which does not overlap the non-display region, of the display control to display. The first control adjustment module 133 may detect whether display content exists in a region of the display control to be adjusted which overlaps the non-display region; in response to the existence of the display content, the first control adjustment module 133 determines the display content in this region and moves the display content sequentially to the region, which does not overlap the non-display region, of the display control to be adjusted to display until the display content does not exist in the region, which overlaps the non-display region, of the display control to be adjusted. In response to the non-existence of the display content, the terminal may not adjust the display content.

In this embodiment, the display content may be a text, a picture, a video, etc. For different display content, a specific adjustment process may be different. For example, for the text, after determining the display content in the region of the display control to be adjusted which overlaps the non-display region, the first control adjustment module 133 may increase an interval between a first word in the display content and a word previous to the first word, so that the display content in the overlapping region is displayed in a non-overlapping region, so as to achieve an adjustment effect shown in FIG. 5. Alternatively, the first control adjustment module 133 may acquire an order of multiple texts and then redistribute the multiple texts at display positions in the non-overlapping region according to the order, which can also achieve the adjustment effect shown in FIG. 5. For example, for the picture, after the display content in the region of the display control to be adjusted which overlaps the non-display region is determined, which direction of the display control the overlap is located in is detected, and then the picture is translated in an opposite direction. For example, if the overlap is located on an upper side of the display control, the picture is moved down until no picture is detected in the region of the display control to be adjusted which overlaps the non-display region.

In a specific implementation of this embodiment, an enlarged area of the display control should be greater than or equal to an area of the non-display region, so as to ensure that the enlarged display control has a region which does not overlap the non-display region, and a size of the region which does not overlap the non-display region is greater than or equal to an original size of the display control, thereby ensuring that the display control has a sufficient displayable region to accommodate the display content after positional adjustment.

In this embodiment, the first control selection module 131 may automatically trigger the detection of whether the display control overlaps the non-display region. For example, it may be set that when a display interface is entered, it is automatically detected whether a display control in the interface overlaps the non-display region, and if so, such a display control is automatically adjusted as the display control to be adjusted.

Figure 14:
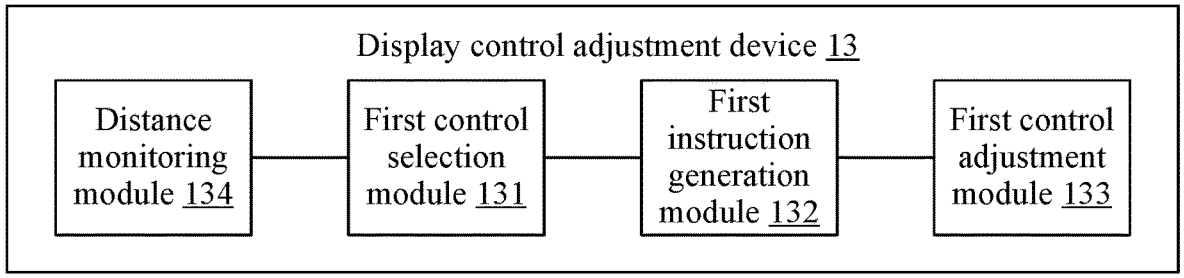
FIG. 14 is a structural diagram of a display control adjustment device according to another embodiment of the present disclosure.

In this embodiment, the first control selection module 131 may be passively triggered. In this case, as shown in FIG. 14, the display control adjustment device 13 further includes a distance monitoring module 134. The distance monitoring module 134 is configured to: before the non-display region on the terminal is determined according to the preset screen parameter, determine that an object outside the terminal approaches the non-display region and a distance between the object and the non-display region is less than or equal to a preset distance threshold. When the distance monitoring module 134 determines that an object outside the terminal approaches the non-display region and the distance between the object and the non-display region is less than or equal to the preset distance threshold, the first control selection module 131 is triggered.

In this embodiment, the first control adjustment module 133 is further configured to: display a display layer of the display control to be adjusted in a top layer of the current display interface, and maintain positions of display controls on the current display interface other than the display control to be adjusted unchanged; or with the display control to be adjusted as reference, adjust a position and/or a size of a display control around the display control to be adjusted in a process of adjusting the region of the display control to be adjusted.

According to the display control adjustment device provided by the embodiment of the present disclosure, the display control to be adjusted is selected from the current display interface, where the display control to be adjusted is the display control whose control region overlaps the non-display region of the display; the control instruction is generated according to the position of the display control to be adjusted with respect to the non-display region; and according to the control instruction, the control region of the display control to be adjusted is adjusted and the content display mode of the display control to be adjusted is adjusted, so that the display content in the display control to be adjusted is displayed in the display region of the display. In this way, the mode in the related art in which display controls in a display interface are fixed is broken through, and the display control to be adjusted with an overlap with the non-display region of the display can be dynamically adjusted, so that the display control can be better operated and the display content can be completely displayed. Therefore, the display controls to be adjusted better meet the actual needs of users and improve user experience.

Figure 15:
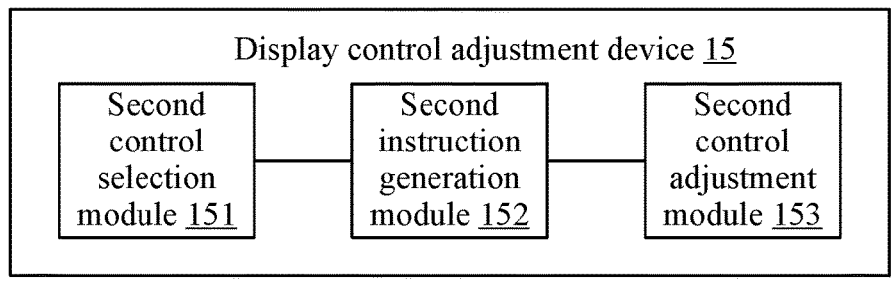
FIG. 15 is a structural diagram of a display control adjustment device according to another embodiment of the present disclosure.

Referring to FIG. 15, a display control adjustment device 15 according to another embodiment of the present disclosure includes a second control selection module 151, a second instruction generation module 152, and a second control adjustment module 153.

The second control selection module 151 is configured to: in response to detecting a second control selection operation, select, according to the second control selection operation, a display control to be adjusted from a current display interface.

The second instruction generation module 152 is configured to: in response to detecting a control adjustment operation, generate, according to a preset correspondence relationship between control adjustment operations and control instructions, a control instruction corresponding to the control adjustment operation.

The second control adjustment module 153 is configured to adjust, according to the control instruction, a control region of the display control to be adjusted or a content display mode of the display control to be adjusted.

The display control to be adjusted in this embodiment is not completely consistent with the display control to be adjusted in the above embodiment. In this embodiment, the display control to be adjusted may be any display control, as long as it is selected by a user through the second control selection operation. However, in the above embodiment, the display control to be adjusted has to be the display control whose control region overlaps the non-display region of the display.

In this embodiment, the second control selection operation may be a touch operation of a user on the display for any display control.

When the display control is selected, the user may simultaneously select multiple display controls as the display controls to be adjusted. In addition, the user may also deselect a selected display control to be adjusted through a corresponding operation to make it a normal display control.

In many cases, the display control is essentially invisible, and the user can only see the content on the display control. Therefore, a control adjustment mode may be set, and it is required that the display control adjustment device 15 can select the display control to be adjusted from all display controls on the current display interface only when it enters the control adjustment mode.

In this embodiment, the control adjustment mode may be entered through a dedicated interface. For example, a virtual button similar to a flight mode switch button may be set to control the control adjustment mode to be on/off. For example, a corresponding mode switch button may be set in a drop-down menu bar or "settings" of the terminal. Of course, physical buttons may also be set to control the control adjustment mode to be on/off. For example, it may be set that the control adjustment mode may be turned on by simultaneously pressing a power button and a home button.

In this embodiment, it may be set that the display control to be adjusted can be adjusted through a corresponding control adjustment operation such as a gesture or a button press. That is, the second instruction generation module 152 may generate a control instruction corresponding to a human-machine interaction operation through the corresponding human-machine interaction operation and a preset correspondence relationship between human-machine interaction operations and control instructions to adjust the display control to be adjusted. For example, it may be set that a stretch operation corresponds to a region enlargement instruction and a pinch operation corresponds to a region reduction instruction, and so on. In this embodiment, a specific correspondence relationship between control instructions and human-machine interaction operations may be preset by an operator based on experience and actual needs.

In this embodiment, in addition to the generation of a corresponding control instruction through the human-machine interaction operation, the second instruction generation module 152 may also automatically generate the control instruction. For example, the second instruction generation module 152 may automatically generate the control instruction according to a size of the display control to be adjusted. For example, if the size of the display control to be adjusted is smaller than a preset size, the region enlargement instruction is automatically generated; if a text size display effect of display content (assumed to be text content) in the display control to be adjusted is smaller than a preset text size display effect, a display content enlargement instruction is automatically generated, and so on. In another embodiment, the second instruction generation module 152 may automatically generate the control instruction according to a position of the display control to be adjusted. For example, if the display control is at an edge of the terminal, the region enlargement instruction may be automatically generated to stretch the region of the display control.

In this embodiment, when the second control adjustment module 153 adjusts the display control to be adjusted according to the control instruction, the region of the display control to be adjusted may be scaled in both a length direction and a width direction, or the region of the display control to be adjusted may be scaled in either the length direction or the width direction. Meanwhile, the display content in the display control to be adjusted may be scaled in size and highlighted.

It should be understood that in this embodiment, the user may directly perform a touch adjustment operation on a control on the display, and the second control selection module 151 automatically adjusts a display control closest to an initial touch position of the touch adjustment operation as the display control to be adjusted according to the touch adjustment operation.

In this embodiment, the display content in the display control may be adjusted while the region of the display control is adjusted. For example, while the display control is enlarged, the display content in the display control may be enlarged. In an embodiment, the display control and the display content may be scaled at a same ratio, to ensure that the display control and the display content always match in size and to ensure a better display effect. However, it should be understood that the display control and the display content may also be scaled at different ratios.

In this embodiment, the second control adjustment module 153 is further configured to: display a display layer of the display control to be adjusted in a top layer of the current display interface, and maintain positions of display controls on the current display interface other than the display control to be adjusted unchanged; or with the display control to be adjusted as reference, adjust a position and/or a size of a display control around the display control to be adjusted in a process of adjusting the region of the display control to be adjusted.

According to the display control adjustment device provided by the embodiment of the present disclosure, in response to detecting the second control selection operation, the display control to be adjusted is selected from the current display interface according to the second control selection operation; in response to detecting the control adjustment operation, the control instruction corresponding to the control adjustment operation is generated according to the preset correspondence relationship between control adjustment operations and control instructions; and finally, according to the control instruction, the control region of the display control to be adjusted is adjusted, or the content display mode of the display control to be adjusted is adjusted. With this solution, the mode in the related art in which display controls in a display interface are fixed is broken through, and the user can select the corresponding display control through the corresponding selection operation to adjust the region or the content display mode, so that the corresponding display control can be better operated by the user and the content in the display control can be better displayed. Therefore, the display control to be adjusted better meets the actual needs of users and improves user experience.

Figure 16:
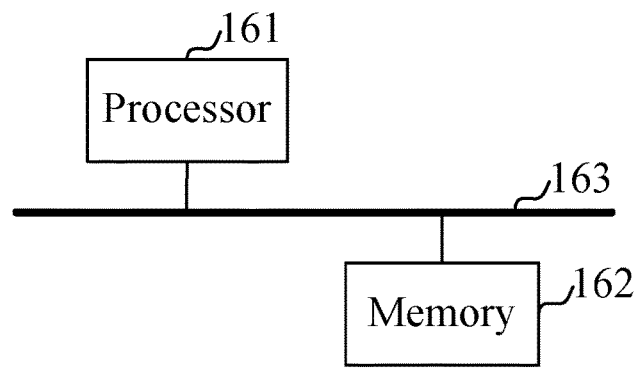
FIG. 16 is a structural diagram of a terminal according to an embodiment of the present disclosure.

This embodiment provides a terminal. As shown in FIG. 16, the terminal includes a processor 161, a memory 162, and a communication bus 163.

The communication bus 163 is configured to implement connection and communication between the processor 161 and the memory 162.

The processor 161 is configured to execute one or more programs stored in the memory 162 to implement steps of the first display control adjustment method according to the embodiments, and/or steps of the second display control adjustment method according to the embodiments.

This embodiment further provides a computer-readable storage medium, such as a floppy disk, an optical disk, a hard disk, a flash memory, a Universal Serial Bus (USB) flash disk, a CompactFlash (CF) card, a Secure Digital (SD) memory card, a Multimedia Card (MMC). The computer-readable storage medium stores computer-executable instructions which are executable by one or more processors to implement steps of any one of the display control adjustment methods according to the embodiments, which are described here again.

Apparently, it should be understood by those skilled in the art that the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a computer-readable storage medium (such as a read-only memory (ROM)/random access memory (RAM), a magnetic disk or an optical disk) and executed by the computing devices. In some circumstances, the illustrated or described steps may be executed in sequences different from those described herein, or the modules or steps are made into one or more integrated circuit modules separately, or multiple modules or steps therein are made into a single integrated circuit module for implementation. Therefore, the present disclosure is not limited to any particular combination of hardware and software.

What is claimed is:

1. A display control adjustment method, comprising:
selecting a display control to be adjusted from a current display interface, wherein the display control to be adjusted is a display control whose control region overlaps a non-display region of a display;
generating a control instruction according to a position of the display control to be adjusted with respect to the non-display region; and
adjusting, according to the control instruction, the control region of the display control to be adjusted and a content display mode of the display control to be adjusted, so that display content in the display control to be adjusted is displayed in a display region of the display;
wherein selecting the display control to be adjusted from the current display interface comprises:
identifying, according to a preset screen parameter and a control region and a control position of each display control on the current display interface, the display control whose control region overlaps the non-display region as the display control to be adjusted, wherein the preset screen parameter is used for determining the non-display region of the display; or
selecting a display control to be operated according to a received control selection operation, detecting whether a control region of the display control to be operated overlaps the non-display region of the display, and in response to a detection result that the control region of the display control to be operated overlaps the non-display region of the display, taking the display control to be operated as the display control to be adjusted; and
wherein before identifying, according to the preset screen parameter and the control region and the control position of each display control on the current display interface, the display control whose control region overlaps the non-display region as the display control to be adjusted, the method further comprises:
determining that an object approaches the non-display region and a distance between the object and the non-display region is less than or equal to a preset distance threshold.

2. The method of claim 1, wherein the preset screen parameter comprises at least one of: a parameter of the non-display region or a parameter of the display region;
in a case where the preset screen parameter comprises the parameter of the display region, identifying, according to the preset screen parameter and the control region and the control position of each display control on the current display interface, the display control whose control region overlaps the non-display region as the display control to be adjusted comprises:
determining an actual displayable region and an ideal regular region of a screen according to the parameter of the display region;
removing the actual displayable region from the ideal regular region of the screen to obtain the non-display region; and
identifying, according to the non-display region and the control region and the control position of each display control on the current display interface, the display control whose control region overlaps the non-display region as the display control to be adjusted.

3. The method of claim 1, wherein adjusting, according to the control instruction, the control region of the display control to be adjusted and the content display mode of the display control to be adjusted comprises:
performing, according to the control instruction, at least one of: enlarging the display control to be adjusted by N times in a length direction, or enlarging the display control to be adjusted by M times in a width direction, wherein N and M are natural numbers greater than 1; and adjusting the display content in the display control to be adjusted to display the display content in a region, which does not overlap the non-display region, of the display control to be adjusted.

4. The method of claim 3, wherein adjusting the display content in the display control to be adjusted to display the display content in the region, which does not overlap the non-display region, of the display control to be adjusted comprises:
   detecting whether display content exists in a region, which overlaps the non-display region, of the display control to be adjusted;
   in response to a detection result that the display content exists in the region, which overlaps the non-display region, of the display control to be adjusted, moving the display content sequentially to the region, which does not overlap the non-display region, of the display control to be adjusted to display, until the display content does not exist in the region, which overlaps the non-display region, of the display control to be adjusted.

5. The method of claim 3, wherein an enlarged area of the display control to be adjusted is greater than or equal to an area of the non-display region.

6. The method of claim 1, in response to adjusting the control region of the display control to be adjusted, further comprising:
   displaying a display layer of the display control to be adjusted in a top layer of the current display interface, and maintaining positions of display controls, other than the display control to be adjusted, on the current display interface unchanged; or
   with the display control to be adjusted as reference, in a process of adjusting the control region of the display control to be adjusted, adjusting at least one of a position or a size of a display control around the display control to be adjusted.

7. The method of claim 1, in response to adjusting the control region of the display control to be adjusted, further comprising:
   displaying a display layer of the display control to be adjusted in a top layer of the current display interface, and maintaining positions of display controls, other than the display control to be adjusted, on the current display interface unchanged; or
   with the display control to be adjusted as reference, in a process of adjusting a region of the display control to be adjusted, adjusting at least one of a position or a size of a display control around the display control to be adjusted.

8. A terminal, comprising a processor, a memory, and a communication bus; wherein
   the communication bus is configured to implement connection and communication between the processor and the memory; and
   the processor is configured to execute one or more programs stored in the memory to implement the following steps:
   selecting a display control to be adjusted from a current display interface, wherein the display control to be adjusted is a display control whose control region overlaps a non-display region of a display;
   generating a control instruction according to a position of the display control to be adjusted with respect to the non-display region; and
   adjusting, according to the control instruction, the control region of the display control to be adjusted and a content display mode of the display control to be adjusted, so that display content in the display control to be adjusted is displayed in a display region of the display;
   wherein the processor is configured to implement selecting the display control to be adjusted from the current display interface by:
   identifying, according to a preset screen parameter and a control region and a control position of each display control on the current display interface, the display control whose control region overlaps the non-display region as the display control to be adjusted, wherein the preset screen parameter is used for determining the non-display region of the display; or
   selecting a display control to be operated according to a received control selection operation, detecting whether a control region of the display control to be operated overlaps the non-display region of the display, and in response to a detection result that the control region of the display control to be operated overlaps the non-display region of the display, taking the display control to be operated as the display control to be adjusted; and
   wherein the processor is configured to further implement, before identifying, according to the preset screen parameter and the control region and the control position of each display control on the current display interface, the display control whose control region overlaps the non-display region as the display control to be adjusted, the following steps:
   determining that an object approaches the non-display region and a distance between the object and the non-display region is less than or equal to a preset distance threshold.

9. The terminal of claim 8, wherein the preset screen parameter comprises at least one of: a parameter of the non-display region or a parameter of the display region;
   in a case where the preset screen parameter comprises the parameter of the display region, the processor is configured to implement identifying, according to the preset screen parameter and the control region and the control position of each display control on the current display interface, the display control whose control region overlaps the non-display region as the display control to be adjusted by:
   determining an actual displayable region and an ideal regular region of a screen according to the parameter of the display region;
   removing the actual displayable region from the ideal regular region of the screen to obtain the non-display region; and
   identifying, according to the non-display region and the control region and the control position of each display control on the current display interface, the display control whose control region overlaps the non-display region as the display control to be adjusted.

10. The terminal of claim 8, wherein the processor is configured to implement adjusting, according to the control instruction, the control region of the display control to be adjusted and the content display mode of the display control to be adjusted by:
   performing, according to the control instruction, at least one of: enlarging the display control to be adjusted by N times in a length direction, or enlarging the display control to be adjusted by M times in a width direction, wherein N and M are natural numbers greater than 1; and adjusting the display content in the display control to be adjusted to display the display content in a region, which does not overlap the non-display region, of the display control to be adjusted.

11. The terminal of claim 10, wherein the processor is configured to implement adjusting the display content in the display control to be adjusted to display the display content in the region, which does not overlap the non-display region, of the display control to be adjusted by:
   detecting whether display content exists in a region, which overlaps the non-display region, of the display control to be adjusted;
   in response to a detection result that the display content exists in the region, which overlaps the non-display region, of the display control to be adjusted, moving the display content sequentially to the region, which does not overlap the non-display region, of the display control to be adjusted to display, until the display content does not exist in the region, which overlaps the non-display region, of the display control to be adjusted.

12. The terminal of claim 10, wherein an enlarged area of the display control to be adjusted is greater than or equal to an area of the non-display region.

13. The terminal of claim 8, wherein in response to adjusting the control region of the display control to be adjusted, the processor is configured to further implement:
   displaying a display layer of the display control to be adjusted in a top layer of the current display interface, and maintaining positions of display controls, other than the display control to be adjusted, on the current display interface unchanged; or
   with the display control to be adjusted as reference, in a process of adjusting the control region of the display control to be adjusted, adjusting at least one of a position or a size of a display control around the display control to be adjusted.

14. A non-transitory computer-readable storage medium, storing computer-executable instructions for executing the following steps:
   selecting a display control to be adjusted from a current display interface, wherein the display control to be adjusted is a display control whose control region overlaps a non-display region of a display;
   generating a control instruction according to a position of the display control to be adjusted with respect to the non-display region; and
   adjusting, according to the control instruction, the control region of the display control to be adjusted and a content display mode of the display control to be adjusted, so that display content in the display control to be adjusted is displayed in a display region of the display;
   wherein the computer-executable instructions are configured to execute selecting the display control to be adjusted from the current display interface by:
   identifying, according to a preset screen parameter and a control region and a control position of each display control on the current display interface, the display control whose control region overlaps the non-display region as the display control to be adjusted, wherein the preset screen parameter is used for determining the non-display region of the display; or
   selecting a display control to be operated according to a received control selection operation, detecting whether a control region of the display control to be operated overlaps the non-display region of the display, and in response to a detection result that the control region of the display control to be operated overlaps the non-display region of the display, taking the display control to be operated as the display control to be adjusted; and
   wherein the computer-executable instructions are configured to further execute, before identifying, according to the preset screen parameter and the control region and the control position of each display control on the current display interface, the display control whose control region overlaps the non-display region as the display control to be adjusted, the following steps:
   determining that an object approaches the non-display region and a distance between the object and the non-display region is less than or equal to a preset distance threshold.

* * * * *